3,539,511
PREPARATION OF ALKALINE EARTH
SULFONATES
Albert R. Sabol, Munster, and Eli W. Blaha, Highland, Ind., assignors to Standard Oil Company, Chicago, Ill., a corporation of Indiana
No Drawing. Filed Nov. 24, 1967, Ser. No. 685,255
Int. Cl. C10m 1/40
U.S. Cl. 252—33         8 Claims

ABSTRACT OF THE DISCLOSURE

Over-based, i.e. high base, alkaline earth sulfonates are prepared by reacting a preferentially oil-soluble sulfonic acid with excess inorganic basic alkaline earth compound in the presence of a lower alkanol and a promoter amount of an aliphatic hydrocarbon-substituted succinic anhydride having at least 30 carbon atoms in the aliphatic substituent or a reaction product of such substituted succinic anhydride and an alkylene amine or a hydroxy-substituted alkylene amine, while passing gaseous carbon dioxide through the reaction mixture, and recovering the resultant high base preferentially oil-soluble alkaline earth sulfonate.

BACKGROUND OF THE INVENTION

Heavy-duty detergent-type lubricating oil compositions for use in spark-ignition internal combustion engines and in diesel engines should possess at least two characteristics in addition to lubricity, oxidation and thermal stability, rust and/or corrosion inhibiting properties, etc. First, the oil should possess the power to disperse insolubles formed by fuel combustion and/or oil oxidation. Second, the oil should be capable of neutralizing acidic materials formed by the oxidation of the oil. These last two characteristics can be imparted to the lubricating oil by incorporating therein over-based or highly alkaline detergents.

Increasing the alkalinity of such detergency addition agents is commonly known as "over-basing." The highly desirable effect from over-basing is to form the carbonate, or sometimes other salt, of the alkaline earth metal in finely dispersed form within the composition. Although such over-basing is usually carried out using either barium or calcium, over-basing with calcium is especially difficult and it is particularly desirable to provide over-basing methods which are capable of utilizing calcium in the desired manner. Calcium over-based detergents are equally effective as replacements for barium over-based products; and in view of the lower cost for calcium compounds, economic advantages could be obtained. However, it has been difficult to obtain calcium-containing detergents having sufficient calcium present, e.g. in the form of calcium carbonate, to provide adequate high-temperature detergency for modern engines. Much difficulty has been encountered in working with inorganic basic calcium compounds in attempting to utilize available calcium from such compounds to an acceptable extent. Attempts to utilize calcium compounds often give discouraging results apparently due to some inability of the calcium compounds to react sufficiently during over-basing procedures.

An improved method for preparing over-based sulfonates is described in U.S. Pat. No. 2,865,965. In accordance with teachings of this patent, over-basing is carried out by treating a reaction mixture of a neutral salt, e.g. a neutral calcium sulfonate, an excess amount of a basic alkaline earth metal compound, such as calcium hydroxide, and a lower alkanol, with gaseous carbon dioxide to produce finely divided and suspended alkaline earth carbonate in the mixture. It has been found that utilization of the metal available for carbonate formation is very inefficient by this technique.

SUMMARY

Improved metal utilization in the above method of preparing over-based sulfonates is obtained by including a promoter hereinafter described in the reaction mixture during carbonation.

The process of the present invention comprises incorporating as promoter from about 0.05 mole to about 1.0 mole, per mole of sulfonic acid, of an aliphatic hydrocarbon-substituted succinic anhydride in which the hydrocarbon substituent contains at least 30 carbon atoms or the reaction product of such substituted succinic anhydride and an alkylene amine or a hydroxy-substituted alkylene amine, in a reaction mixture of a high molecular weight preferentially oil-soluble sulfonic acid from about 1.0 mole to about 10 moles per mole of sulfonic acid of an inorganic basic alkaline earth compound and from about 5 moles to about 15 moles of a lower alkanol of from 1 to about 4 carbon atoms per mole of sulfonic acid; then introducing gaseous $CO_2$ into the reactive mixture at a rate of from about 0.5 to about 4.0 cubic feet per hour for a period of from about 1 hour to about 8 hours at a temperature of from about 75° F. to about 150° F., preferably from about 80° F. to about 110° F., to convert unreacted basic alkaline earth compound to the carbonate. The reaction mixture is then heated to a temperature, e.g. 340° F., to remove the alkanol and water of reaction, and then filtered to recover the overbased product.

The suitable inorganic basic alkaline earth compounds are well known to those skilled in the art, and include the oxides and hydroxides of calcium, strontium, magnesium and barium.

Sulfonic acids suitably used in accordance with this invention are preferentially oil-soluble sulfonic acids. Such sulfonic acids include preferentially oil-soluble petroleum sulfonic acids commonly referred to as "mahogany acids," alkyl sulfonic acids, aryl sulfonic acids, and alkaryl sulfonic acids. Illustrative of suitable sulfonic acids are the preferentially oil-soluble petroleum sulfonic acids, e.g. "mahogany acids" of about 350 to 750 molecular weight, dilauryl aryl sulfonic acid, laurylcetyl aryl sulfonic acid, paraffin wax-substituted benzene sulfonic acids, didodecyl benzene sulfonic acids, polyolefin alkylated benzene sulfonic acids, such as polybutylene alkylated benzene sulfonic acids, in which the polybutylene substituents have molecular weights of at least about 200, and preferably within the range of from about 300 to about 2500; polypropylene alkylated benzene sulfonic acids in which the polypropylene substituents have a molecular weight of at least about 250, and preferably within the range of from about 290 to about 1500; naphthalene sulfonic acids; alkyl-substituted naphthalene sulfonic acids; and the like.

The aliphatic hydrocarbon-substituted succinic anhydride promoter of the present invention is readily obtained by reacting maleic anhydride with a polymer of a lower mono-olefin, such as polymers containing at least 30 carbon atoms of $C_2$ to $C_4$ mono-olefins. Chlorinated derivatives of such polymers can also be reacted with the maleic anhydride. Also, high molecular weight substantially aliphatic hydrocarbons both naturally occurring or synthesized can be reacted with maleic anhydride. Thus the promoter can be prepared by reacting maleic anhydride with high molecular weight substantially aliphatic hydrocarbons synthesized by refinery polymerization processes or other polymerization process or high molecular weight polywaxes provided such hydrocarbons have an unsaturated group or are chlorinated. The aliphatic hydrocarbon substituent should have at least 30 carbon atoms, and preferably from about 50 to about 200 or more carbon atoms, and molecular weights in the range of from about 400 to about 100,000.

The other class of promoter, namely, the reaction product of the above-defined hydrocarbon-substituted succinic anhydride and an alkylene amine or a hydroxy-substituted alkylene amine is readily obtained by reacting such hydrocarbon-substituted succinic anhydride with the amine at a temperature of from 150° F. to about 500° F. and finishing by removing by-product water, such as by blowing with nitrogen or other inert gas, at a temeparture of about 250° F. to about 320° F. The amount of amine reactant used is from about 0.5 to about 2.0 mole, preferably from about 0.6 to about 0.8 mole per mole of the hydrocarbon-substituted succinic anhydride.

The amine reactant can be primary or secondary amines. Desirably, the amines are polyamines, especially alkylene amines which are principally polymethylene amines, including methylene amine ethylene amine, butylene amines, propylene amines, pentylene amines, hexylene amines, heptylene amines, octylene amines and other polymethylene amines wherein the alkylene group contains suitably up to 10 carbon atoms and desirably 8 or less carbon atoms. The alkylene amines can contain such of the aforementioned polymethylene groups joined by nitrogen atoms as in the polyalkylene polyamines as, for example, in ethylene diamine, triethylene tetramine, propylene diamine, decamethylene diamine, octamethylene diamine, di(heptamethylene) triamine, tripropylene tetraamine, tetraethylene pentaamine, trimethylene diamine, pentaethylene hexamine, di(trimethylene) triamine, 2 - heptyl-3-(2-aminopropyl) imidazoline and others including higher homologues of the foregoing obtained by condensing two or more alkylene amines.

The preferred amines are ethylene amines which amines are derived by the reaction of ethylene chloride with ammonia. Such reaction results in the production of complex mixtures of alkylene amines even including cyclic condensation products such as piperazines. Such mixtures are as useful as the pure ethylene amines.

Hydroxy-substituted amines such as amino alcohols include, for example ethanol amine, diethanol amine, as well as hydroxylalkyl-substituted alkyl amines of which N - (2-hydroxyethyl) ethylene diamine, N,N'-bis(2-hydroxyethyl) ethylene diamine, 1-(2-hydroxyethyl) piperazine, mono - hydroxypropyl-substituted diethylene triamines, 1,4 - bis(2 - hydroxypropyl) piperazine, di-hydroxypropyl-substituted tetraethylene pentamine and others.

PREFERRED EMBODIMENTS

Example I

A reaction mixture of one mole of a preferentially oil-soluble petroleum sulfonic acid having a molecular weight of 490 (1435 grams of a 34% mineral oil solution of the acid), 0.1 mole of a polybutene-substituted succinic anhydride having a molecular weigh of 960 (200 grams of a 46% mineral oil solution of the anhydride), 7 moles calcium hydroxide (520 grams) and 400 cc. methanol was formed at room temperature. Gaseous carbon dioxide was passed into the reaction mixture at the rate of 1.2 cubic feet per hour for a period of 3 hours. The temperature range of the reaction mixture during the $CO_2$ addition was 80°–140° F. After 3 hours the mixture was heated to 340° F. to remove the methanol and water, and filtered.

The resultant filtered calcium sulfonate had a total base number (TBN) of 245, contained 11.8% calcium and 1.62% sulfur. The calcium hydroxide utilization was 98%. Conducting the reaction in the absence of the polybutene substituted succinic anhydride promoter, the calcium hydroxide utilization was about 40%.

Example II

One mole of a preferentially oil-soluble petroleum sulfonic acid having a molecular weight of 490 (1090 grams of a 45% oil solution of the acid) and 0.45 mole of the promoter, hereinafter described (200 grams of a 46% active promoter), 345 grams of a SAE–5W petroleum oil, 400 cc. methanol and 8 moles of calcium hydroxide (600 grams) were charged to a reactor flask at room temperature, and gaseous carbon dioxide passed through the mixture at the rate of 1.2 cubic feet per hour for 3.5 hours. The temperature of the reaction mixture during the period of $CO_2$ blowing was 80–132° F. At the end of the 3.5 hour period the mixture was heated to 340° F. to remove the methanol and water, and filtered.

The resultant filtered calcium sulfonate contained 13.1% calcium (theo. 13.2%), 1.6% sulfur and has a total base number (TBN) of 300. The calcium utilization was 96%, and without promoter was about 40%.

The promoter used in this example was the reaction product of 0.6 mole tetraethylene pentaamine (TEPA) and one mole of polybutenyl succinic anhydride having a molecular weight of about 960.

The foregoing data demonstrates that the use of the hereindescribed promoters in the preparation of over-based alkaline earth sulfonates results in greatly improved metal utilization.

Percentages given herein are weight percentages unless otherwise stated.

While particular preferred embodiments of the invention have been described, it is to be understood that the invention is not limited thereto, but covers such modifications and variations as come within the spirit and scope of the appended claims.

We claim:

1. In the process of preparing an over-based preferentially oil-soluble alkaline earth sulfonate which comprises reacting a preferentially oil-soluble sulfonic acid with an excess of an inorganic basic alkaline earth compound in the presence of a lower alkanol and passing gaseous carbon dioxide through the reaction mixture, the improvement comprising conducting said reaction in the presence of from about 0.1 to 1.0 mole per mole of said sulfonic acid of a promoter selected from the class consisting of (a) an alpihatic hydrocarbon-substituted succinic anhydride having at least 30 carbon atoms in the aliphatic hydrocarbon substituent and (b) the product obtained from the reaction at a temperature of from about 150° F. to about 500° F. of an aliphatic hydrocarbon-substituted succinic anhydride having at least about 30 carbon atoms in the aliphatic hydrocarbon substituent and about 0.5 mole to about 2.0 moles of an amine for each mole of said succinic anhydride used, said amine being selected from the class consisting of alkylene amines and hydroxy substituted alkylene amines.

2. The process of claim 1 in which the promoter is an aliphatic hydrocarbon-substituted succinic anhydride having at least 30 carbon atoms in the hydrocarbon substituent.

3. The process of claim 2 wherein said promoter is a polybutene-substituted succinic anhydride having a molecular weight of 960.

4. The prcess of claim 1 in which the aliphatic hydrocarbon substituent of the succinic anhydride is an olefin polymer having a molecular weight of from about 420 to about 5000.

5. The process of claim 4 in which the olefin polymer is a polybutene.

6. The process of claim 1 in which the amine in promoter (b) is a polyethylene polyamine.

7. The process of claim 1 in which the amine in promoter (b) is tetraethylene pentamine.

8. The process of claim 1 in which the promoter is the reaction product of 0.6 mole of tetraethylene pentamine and 1.0 mole aof a polybutene-substituted succinc anhydride having a molecular weight of 960.

References Cited
UNITED STATES PATENTS 3,377,281　4/1968　Gower _____ 252—33

DANIEL E. WYMAN, Primary Examiner

I. VAUGHN, Assistant Examiner

U.S. Cl. X.R.

252—33.2, 33.4